March 16, 1965  F. B. HARLEY  3,173,718
PARACHUTE CONNECTORS

Filed May 3, 1963  4 Sheets-Sheet 1

INVENTOR
FRANK B. HARLEY

BY
ATTORNEYS

March 16, 1965 F. B. HARLEY 3,173,718
PARACHUTE CONNECTORS

Filed May 3, 1963 4 Sheets-Sheet 2

INVENTOR
FRANK B. HARLEY
BY
ATTORNEY

March 16, 1965   F. B. HARLEY   3,173,718
PARACHUTE CONNECTORS

Filed May 3, 1963   4 Sheets-Sheet 3

INVENTOR
FRANK B. HARLEY

BY

ATTORNEY

March 16, 1965 F. B. HARLEY 3,173,718
PARACHUTE CONNECTORS

Filed May 3, 1963 4 Sheets-Sheet 4

INVENTOR
FRANK B. HARLEY
BY
ATTORNEY

United States Patent Office

3,173,718
Patented Mar. 16, 1965

3,173,718
PARACHUTE CONNECTORS
Frank Bernard Harley, Egham, England, assignor of one-half to Harley Patents (International) Limited, London, England, a company of Great Britain
Filed May 3, 1963, Ser. No. 277,881
Claims priority, application Great Britain, May 8, 1962, 17,728/62
11 Claims. (Cl. 294—83)

This invention relates to parachute connectors which are arranged to interconnect one or more parachutes and either a parachutist or a cargo such as military equipment which may for example comprise a truck weighing of the order of one ton. For simplicity the term "cargo" will be used herein to cover any form of object to be carried by the parachute.

Particularly with heavy military loads it is desirable that the cargo should be released automatically immediately it reaches the ground since in high winds the parachute, if still connected to the cargo, could drag it across the ground and result in severe damage. However, it is clearly impossible to have a connector which is ready for such automatic release before it leaves the aircraft and before the parachute has opened. It can happen that if it is arranged that the connector is set for automatic release after the cargo and parachute have been dropped from the aircraft but before the parachute has fully opened there is a danger that the load on the connector, due to the cargo, can vary very considerably if a gust of wind or other factor causes the partly-opened parachute momentarily to deflate. If the connector were at that stage set to disconnect the cargo automatically on the load being relieved release of the cargo would occur in mid-air.

According to the present invention a parachute connector which is arranged to interconnect a parachute and a cargo comprises a body affording a main part to which the parachute may be connected, a fastener by which the cargo can be releasably secured to the body, the fastener being movable automatically from an engaged position to a released position when the load due to the cargo is relieved, e.g. on reaching the ground, and a safety device arranged to prevent such automatic movement of the fastener before and during an initial period of drop.

The fastener is conveniently retained in the engaged position by a predetermined low load and the safety device may normally be operative to prevent the said automatic movement but be set to commence to move to a position in which release of the fastener is possible, by means of a predetermined medium load being applied to the fastener by the cargo. The time taken thereafter for the safety device to move to a position in which release of the fastener is possible is preferably such that a predetermined high load will have by then been applied by the cargo.

The safety device may for example include a latch which is spring-biassed to move towards an open position but which is engaged by a part of the fastener to prevent such movement when the load on the fastener is at or above the predetermined low load. Conveniently the fastener and latch comprise pivoted members provided with flat surfaces for engagement with one another which surfaces when engaged lie substantially at right angles to a radius from the axis of the latch and extending through the surfaces such that the load on the fastener acts substantially through the pivotal axis of the latch. The fastener and latch may also be provided with a notch on one and a projection on the other for engagement with one another when the flat surfaces are engaged.

The main part may be connected to the body by a shear connection which, when broken, permits limited relative movement of the main part and the body whereafter the safety device is free to move to a position in which release of the fastener is possible, and the safety device may conveniently include a safety catch normally held stationary by the main part to hold the latch in the engaged position but which, after the shear connection breaks is free to move to a position at which release of the fastener is possible.

The safety catch may have on it or integral with it a counterweight to retard its movement and the safety catch is conveniently pivoted to the body and is spring biassed towards the position in which release of the fastener is possible. The bias of the spring may act at a relatively small radius from the pivot of the safety catch in order to ensure relatively slow movement of the safety catch and conveniently the same spring serves to bias both the latch and the safety catch to their release positions. Alternatively separate springs may be provided.

The invention may be carried into practice in a number of ways but one specific embodiment will now be described by way of example with reference to the accompanying drawings in which.

Figure 1:
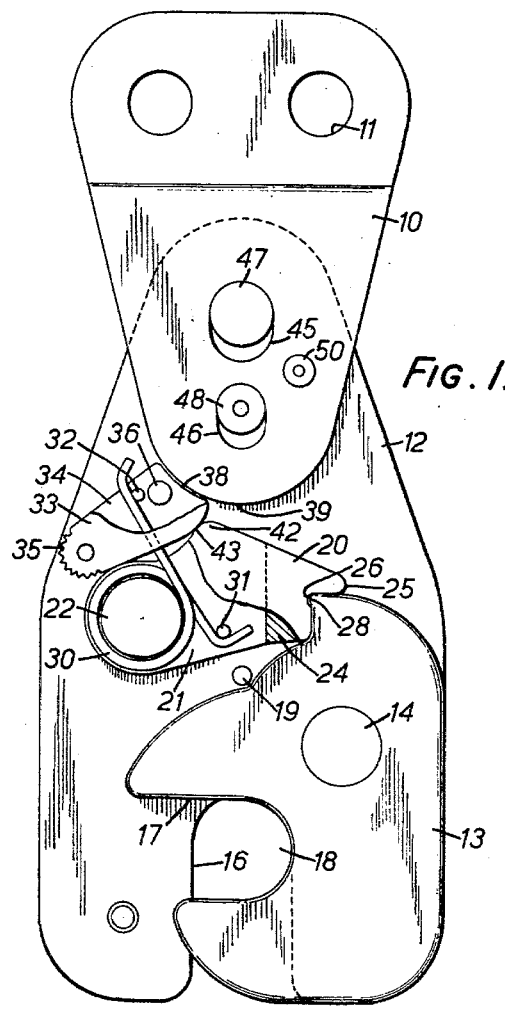
FIGURE 1 is a side elevation, partly in section, of a connector for use with a parachute, the hook of which is in a closed and locked position.
Figures 2, 3:
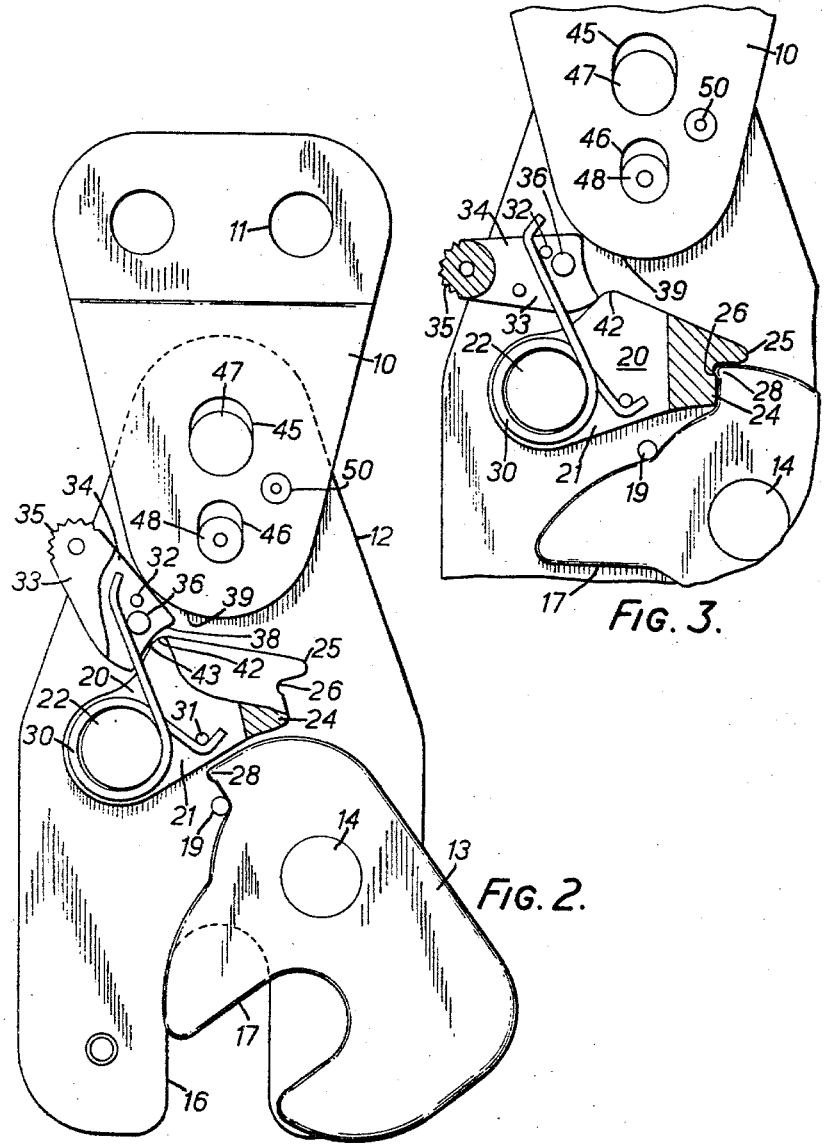
FIGURE 2 is similar view of the connector with the hook in the open position.
FIGURE 3 is a scrap view partly in section showing the manner in which the safety catch operates.

The connector forming the first embodiment shown in FIGURES 1 to 3 is employed for connecting a parachute or parachutes to a load such as a small truck or other piece of military equipment weighing of the order of 1 ton. For this purpose the connector has a triangular plate 10 provided with two holes 11 for connection to the parachute or parachutes. The plat 10 extends between a pair of further plates 12 forming a body within which a hook 13 is mounted on a pivot pin 14 to move between a closed or engaged position shown in FIGURE 1 and an open or released position shown in FIGURE 2. For this purpose the plates 12 have, at their lower ends, aligned open-ended slots 16 and the hook 13 has an open-ended slot 17 which in the closed position of FIGURE 1 extends at right angles to the slots 16 in the plate 12 so that a cable, chain or other loop may be trapped in an aperture 18 but be released when the hook 13 is pivoted to the open position of FIGURE 2. When the hook 13 is free to pivot it will be appreciated that the load can draw the hook to the open position automatically. This movement is limited by a stop 19.

To retain the hook 13 in the closed position of FIGURE 1, a locking lever 20 is provided. This comprises a pair of side rails 21 each extending around a pivot 22 at its left-hand end. The two rails 21 are united at their other ends by a transverse bar 24 which has a nose-like projection 25 arranged to overlie the upper end of the hook 13 in the closed position of FIGURE 1. The underside of the projection 25 merges into a small semi-circular recess 26 in the bar 24 which co-operates with a semi-circular tongue 28 on the hook 13.

Surrounding the pivot 22 is a spring 30, one end of which is hooked around a pin 31 extending between the side rails 21 and the other end of which bears on a further pin 32, which will be referred to later. The result is that the spring 30 is tending to rotate the locking lever 20 in an anti-clockwise direction, as viewed in FIGURE 1, i.e., it is tending to move the locking lever to a release position. Clearly in order for the locking lever 20 to move to a release position the semi-circular tongue 28 on the hook 13 has to move slightly in a clockwise direction as shown in FIGURE 3. Any load on the loop of cable or chain passing through the aperture 18 will be resisting this clockwise movement of the hook 13. Hence there will be a limiting minimum load (which may for example be of the order of 20 lbs.) which the spring 30 can overcome in order to force the hook 13 clockwise to a sufficient extent that the locking lever 20 can move to the release position.

Hence, if the locking lever is otherwise free to move in an anti-clockwise direction, it will do so once the load on the hook is reduced to this limiting minimum load. Thus in practice when the parachute and its load reaches the ground the load on the hook 13 will no longer counteract the force of the spring 30 so that this spring will then move the locking lever anti-clockwise to the release position of FIGURE 2 and the hook 13 will also move to the open position as shown, automatically to release the loop of chain or cable and so disengage the parachute from its load.

Clearly both before and at the moment when the connector, its parachute, and the load are dropped from an aircraft the load applied to the hook 13 will be negligible so it is necessary to ensure that the locking lever is retained in a safe position until at least the minimum release load of 20 lbs. has been applied to the hook 13. For safety purposes such release is not obtained until substantially higher loads are applied as will be described.

For this purpose a safety catch 33 is provided which is of channel or U-form having a pair of side pieces 34 and a base of interconnecting portion 35. The ends of the side rails 34 remote from the base 35 are pivoted about a pin 36 extending between the two plates 12 and serving with the pivots 22 and 14 to keep the plates separated. It will be seen that the safety catch 33 is contoured with a concave surface 38 to follow the convexly rounded surface 39 of the apex of the triangular plate 10 when this is in the position shown in FIGURE 1. The pin 32, already referred to, and against which one end of the spring 30 acts, also extends between the side rails 34 of the safety catch. In the position shown in FIGURE 1 a convexly rounded protuberance 42 of the locking lever 20 is engaging convex surfaces 43 on the side rails 34 of the safety catch 33. This prevents any anti-clockwise movement of the locking lever 20 towards its release position.

The triangular plate 10 has in it two slightly elongated openings 45 and 46, which co-operate with pins 47 and 48 respectively extending between the plates 12. Also extending between the triangular plate 10 and the plates 12 is a shear wire 50 serving normally to prevent relative movement of the plate 10 and the plates 12. When the load on the shear wire reaches a predetermined value the shear wire will break to permit the plate 10 to move upwards to the position of FIGURE 2. In this position the safety catch 33 is free to rotate clockwise under the action of the spring 30 eventually to assume the position shown in FIGURE 2, in which the locking lever 20 can move to the release position. The movement of the safety catch is relatively slow, for example it may take .5 of a second since the spring 30 is acting at a quite small radius from the pivot 36 and also the base 35 of the safety catch acts somewhat as a counterweight.

In practice where the weight of the load on the hook 13 is of the order of 1 ton the shear wire 50 is arranged to break when the actual load on the hook 13 reaches approximately 400 lbs. which will occur a fraction of a second after the parachute has begun to open.

FIGURE 3 indicates the manner in which, if the locking lever 20 were to try to rotate anti-clockwise before the safety catch 33 is fully released the movement of the locking lever 20 is still prevented by the safety catch which has not yet moved completely out of the way.

During the period which the safety catch takes fully to rotate to its release position of FIGURE 2, the parachute will have become more fully opened and the deceleration of the load will have increased the actual load on the hook 13 considerably, perhaps to several times the actual weight of the load. It is so arranged that by the time the safety catch does permit the locking lever to rotate, the actual load on the hook 13, due to deceleration, is so considerable (e.g. 4,000 lbs. or more) that no relaxation of this load is likely e.g. due to a temporary collapse of the parachute perhaps by a gust of wind.

When the actual load is between 400 lbs. and say 4000 lbs. such gusts of wind have been found to reduce the actual load on the hook 13 to a very low figure. If at this time no safety catch were provided the locking lever 20 would be free to be rotated by the spring 30 and so release the load in mid-air.

Thus with the connector according to FIGURES 1 to 3 the approximate actual loads may be as shown in the following sequence of operations.

| Position | Load on Hook | Operation |
| --- | --- | --- |
| 1. In aircraft | Nil | Shear wire unbroken. |
| 2. Instant of drop | Nil | Safety catch engaged. |
| 3. Fraction of second after parachute begins to open. | 400 lbs | Shear wire breaks, Safety catch begins to rotate. |
| 4. Further fraction of second-parachute further opens. | 3,000 lbs | Safety catch in Fig. 3 position still prevents release of locking lever. |
| 5. Sudden gust of wind deflates partly opened parachute. | Nil | Locking lever still cannot rotate and so prevents release of hook (Figure 3). Safety catch still prevents movement of locking lever. |
| 6. Gust reduced, parachute opens and load now applied again. | Say 4,000–6,000 lbs. | Locking lever returns from Fig. 3 position to Fig. 2 position and held by load on hook. |
| 7. Parachute fully open and deceleration complete. | 1 Ton | Safety catch released completely. |
| 8. Load reaches ground | Nil | Locking lever released; Load released. |

It will be appreciated that if at stage (4) the parachute continues to open without a gust or other factor causing the actual load on the hook to be relieved, the actual load will rise considerably during deceleration, say up to 16,000 lbs. or more. Thereafter the load will reduce again to the actual 1 ton load. The parachute will by now be fully opened and there is no danger of the load on the hook being reduced until it reaches the ground, even if a further gust should occur. It is only during the opening of the parachute that this danger exists.

Thus the arrangement according to the invention provides a connector which is secure while the parachute is opening until the load on it is well above a value at which a gust or other factor could cause it to drop sufficiently to release the load. Thereafter the connector is set so that on reaching the ground release of the load automatically occurs.

Whilst the time taken for the various operations can vary according to the requirements, the particular example given above is arranged to be operated by a static line so that from the instant of dropping to the moment when the shear wire breaks about 1½ seconds elapses. The time taken thereafter for the parachute fully to open can vary considerably but in general it will take of the order of a further 2 to 2½ seconds. It will be appreciated that in the example given above the initial period of drop, during which the safety catch is still operative, comprises the 1½ seconds referred to plus the ½ second the safety catch takes to release, making 2 seconds in all.

Figure 4:
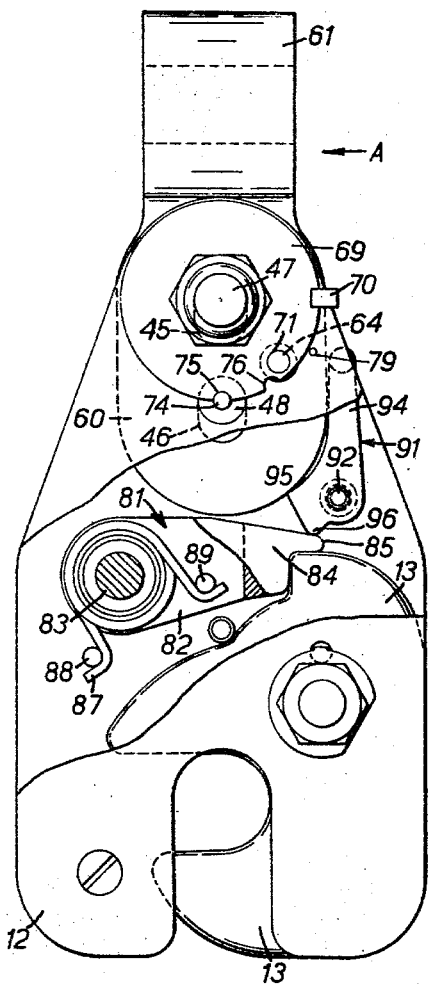
FIGURE 4 is a view, generally similar to FIGURE 1, of a second embodiment.
Figure 5:
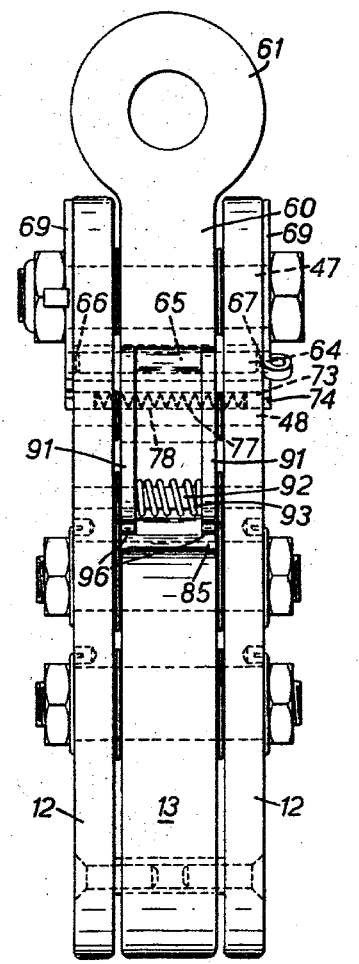
FIGURE 5 is a side elevation of the connector of FIGURE 4 viewed in the direction of the arrow A on FIGURE 4.

A second embodiment is shown in FIGURES 4 to 7. Generally the form of the connector is similar to that of the first embodiment, and accordingly certain parts bear the same reference numerals. Thus, as in the first embodiment, the connector comprises a body which includes a pair of plates 12, shown clearly in FIGURE 5, which are spaced apart and which, adjacent their upper ends, receive between them a sliding member 60 formed at its upper end with an integral sleeve 61 for connection to the parachute or parachutes. The sliding member 60 and the sleeve 61 correspond to the triangular plate 10 of the first embodiment. As shown in FIGURE 4 the sliding member 60 is provided with slightly elongated openings 45 and 46 which cooperate with pins 47 and 48 respectively which extend between the plates 12. As in the first embodiment these pins and the elongated openings permit slight relative movement between the sliding member 60 and the plates 12. Such sliding movement when the device is operative is normally prevented by means of a shear pin 64 which extends through an opening 65 in the sliding member 60 and aligned openings 66 and 67 in the two plates 12. The shear pin 64 can be inserted from the either side but in order to close off the outer ends of the openings 66 and 67, to prevent the shear pin falling out, a shear pin shroud 69 in the form of a disc is provided on each side lying closely against the face of the respective plate 12. Each shroud 69 has a finger piece 70 by which it can be turned through an angle of approximately 40° between the position e.g. shown in FIGURE 4 in which a hole 71 in the shroud 69 is in line with the opening 66 to permit insertion of the shear pin, and a position in which the hole 71 lies above the pin 48, and therefore the shroud covers the end of the opening 66. In FIGURE 5 the shroud on the right-hand side is shown in this second position. Mounted in each end of the pin 48 is a plunger 73 affording a small pin 74 at its outer end which can be located in one of two semi-circular cut outs 75 or 76 formed in the periphery of the shroud 69 on that side in order to locate the shroud in one or other of two positions. The two plungers 73 are biassed outwards by means of a compression spring 77 extending through a bore 78 in the pin 48. Accordingly to move either shroud from one position to the other the plunger 73 on the respective side has to be depressed by applying finger pressure to the end face of the pin 74 and thereafter turning the shroud by using the finger piece 70. As shown in FIGURE 4 a small circular mark 79 is provided which in practice will be formed of a red paint of other red material to provide an indication that the shroud plate 69 is not in a position in which the cut out 76 is engaged by the pin 74. As soon as the cut out 76 is engaged by the pin 74 the finger piece 70 will cover the mark 79 and indicate that the shroud on that side is satisfactorily located in a position in which the shear pin cannot fall out.

It will be seen from FIGURE 4 that the form of the hook 13 of this embodiment is very similar to the hook of the first embodiment except that the tongue 28 of the first embodiment is omitted. As in the first embodiment the hook 13 is maintained in the closed position of FIGURE 4 by means of a locking lever 81 which, like the locking lever 20 of the first embodiment, comprises a pair of side rails 82 which extend around a pivot 83 at their left hand ends. The two rails 82 are united at their other ends by a transverse bar 84 which has a nose-like projection 85 arranged to overlie the upper end of the hook 13 in the closed position of FIGURE 4.

Surrounding the pivot 83 is a spring 87 the ends of which are hooked around pins 88 and 89, the first of which extends between the plates 12 and the second of which extends between the side rails 82 of the locking lever. Accordingly, as in the first embodiment, the locking lever 81 is tending to rotate in an anti-clockwise direction as viewed in FIGURE 4 i.e. it is tending to move to a release position at which the hook 13 can open.

Normally preventing such anti-clockwise movement is a safety catch 91 having a pair of sides shown in FIGURE 5 and each in the form of a lever pivoted about a transverse rod 92 and biassed to rotate in a clockwise direction as viewed in FIGURE 4 by means of a coil spring 93. As shown in FIGURES 4 and 5, one end 94 of each lever extends generally vertically upwards to lie close to the sliding member 60 and between the plates 12 and these ends are joined as shown in FIGURE 5. The other end 95 of each lever has a projection 96 which, in the position of FIGURE 4, engages the upper surface of the nose-like projection 85 to hold the locking lever in that position so that at this stage the hook 13 cannot be released.

In order to release the hook 13 a number of operations have to take place. Firstly the shear pin 64 has to break by the application of a predetermined load between the sliding member 60 which is connected to the parachute or parachutes and the load on the hook. This will enable the sliding member to rise and in turn the safety catch 91 will be able to rotate in a clockwise direction to enable the locking lever to rotate and the hook 13 to open. The positions of the various parts at the end of this series of operations appear in FIGURE 6.

Figures 6, 7:
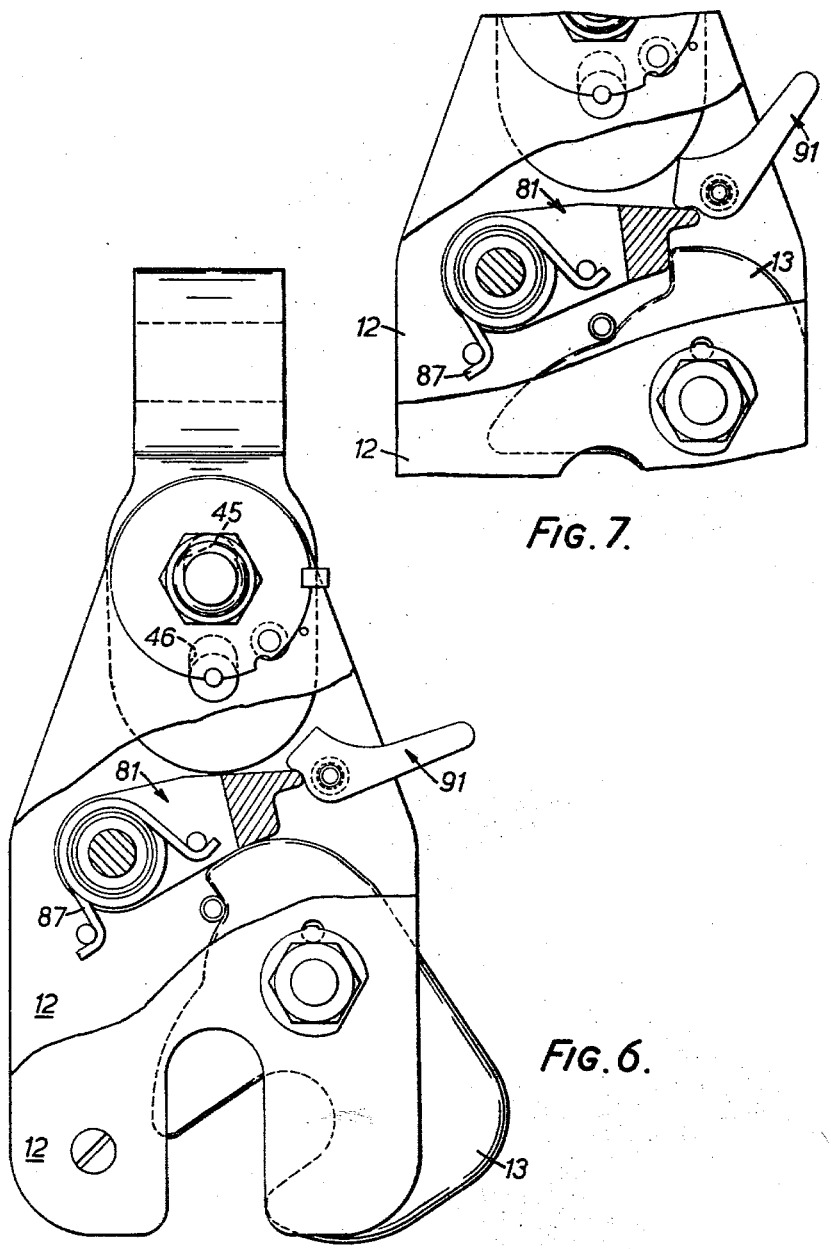
FIGURE 6 is a view of the connector of FIGURES 4 and 5 with the hook in the open position.
FIGURE 7 is a scrap view, partly in section, showing the manner in which the safety catch of the arrangement of FIGURES 4 to 6 operates.

Whilst the operation of the device shown in FIGURES 4 and 7 is very similar to that of the first embodiment and although the actual load to be carried is again of the order of 1 ton the loadings at which the various operations take place are different. For example the shear pin 64 is arranged not to break until the load on it has reached the order of 3000 lbs. However the minimum load on the hook which will cause the spring 87 to bias the locking lever 81 away from the hook 13 is of the order of 100 lbs. Accordingly whilst in the aircraft the parts will all remain in the position shown in FIGURE 4 and the fact that there is no load on the hook 13 will not matter since the locking lever cannot rotate because of the position of the safety catch 91 and the sliding member 60. During an initial period of drop the parachute will have only commenced to open, and therefore the load upon the hook 13 due to deceleration will rise from nothing to 3,000 lbs. at which time the shear pin 64 will break and the sliding member 60 and the plates 12 will move relatively to one another to the extent permitted by the elongated openings 45 and 46. Once this relative movement has taken place the safety catch 91 can be rotated by the coil spring 93 towards the position shown in FIGURE 6. Although the time taken for the movement of the safety catch to the position of FIGURE 6 will be very short, during this time the deceleration of the load due to the parachutes opening will cause the actual load applied to the hook 13 to rise substantially above 3,000 lbs. In the event of a gust of wind deflating the parachute or parachutes with the result that the load on the hook 13 is reduced and the locking lever tends to open, it will not be able fully to open because of the slow movement of the safety catch from its initial to its release position.

Accordingly the actual load applied to the hook 13 before the locking lever can be fully released will always be many times greater than that applied to the locking lever by the spring 87. Hence until the load reaches the ground and the load on the hook is reduced to about 100 lbs. there is no danger of the locking lever 81 releasing the hook 13.

What I claim as my invention and desire to secure by Letters Patent is:

1. A parachute connector comprising a main part to which the parachute may be connected, a body upon which the main part is mounted for limited relative movement thereto from an initial position to a second position, a shear connection arranged normally to prevent such relative movement but which is arranged to be broken by the application of a predetermined medium load, a hook type fastener pivoted to the body for securing the cargo, a latch also pivoted to the body for movement between a release position and a latching position in which it cooperates with the said hook-type fastener to retain the fastener in an engaged position, said latch being retained in said latching position by load imposed on the fastener by said cargo, a safety catch pivoted to the body and arranged to engage both the latch and the main part both in the said initial position of said main part and during movement of said main part between the initial and second positions thereof, thereby blocking movement of the latch, and spring means arranged to bias the safety catch clear of the latch when the main part reaches the said second position and bias the latch towards its release position with a force sufficient to overcome a predetermined low load.

2. A connector as claimed in claim 1 wherein the medium load is greater than the actual weight of the cargo.

3. A connector as claimed in claim 1 in which the time taken for the safety device to move to a position in which release of the fastener is possible is such that a predetermined high load will have by then been applied by the cargo.

4. A connector as claimed in claim 1 in which the fastener and latch comprise pivoted members provided with flat surfaces for engagement with one another which surfaces when engaged lie substantially at right angles to a radius from the axis of the latch and extending through the surfaces such that the load on the fastener acts substantially through the pivotal axis of the latch.

5. A connector as claimed in claim 1 in which the fastener and latch are also provided with a notch on one and a projection on the other for engagement with one another when the flat surfaces are engaged.

6. A connector as claimed in claim 1 in which the safety catch has on it or integral with it a counter-weight to retard its movement.

7. A connector as claimed in claim 1 in which the bias of the spring means acts at a relatively small radius from the pivot of the safety catch.

8. A connector as claimed in claim 7 in which the same spring means serves to bias both the latch and the safety catch to their release positions.

9. A connector as claimed in claim 1 wherein the shear connection comprises a shear pin insertable through aligned openings in the main part and the body.

10. A connector as claimed in claim 9 including a shroud connected to said main part and arranged to cover an open end of one of the openings and movable to a position in which the end is uncovered.

11. A connector as claimed in claim 10 in which the shroud can be locked in two positions in one of which the open end is exposed and in the other of which it is not.

References Cited by the Examiner
UNITED STATES PATENTS

| | | | |
|---|---|---|---|
| 2,852,217 | 9/58 | Engelhardt | 294—83.1 |
| 2,858,161 | 10/58 | Smith | 294—83 |
| 3,109,676 | 11/63 | Mercer | 294—84 |

SAMUEL F. COLEMAN, *Primary Examiner.*

ERNEST A. FALLER, JR., *Examiner.*